United States Patent
Yamashiro et al.

(10) Patent No.: US 10,907,034 B2
(45) Date of Patent: Feb. 2, 2021

(54) PNEUMATIC TIRE

(71) Applicant: SUMITOMO RUBBER INDUSTRIES, LTD., Kobe (JP)

(72) Inventors: Yuhei Yamashiro, Kobe (JP); Hayato Yoshiyasu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 62 days.

(21) Appl. No.: 15/993,164

(22) Filed: May 30, 2018

(65) Prior Publication Data
US 2019/0010313 A1 Jan. 10, 2019

(30) Foreign Application Priority Data
Jul. 5, 2017 (JP) .................. 2017-132015

(51) Int. Cl.
*C08L 9/06* (2006.01)
*B60C 1/00* (2006.01)
*C08C 19/02* (2006.01)
*C08L 15/00* (2006.01)
*C08K 3/36* (2006.01)
*C08L 7/00* (2006.01)
*C08K 3/04* (2006.01)
*C08K 5/00* (2006.01)
*C08L 9/00* (2006.01)

(52) U.S. Cl.
CPC .................. *C08L 9/06* (2013.01); *B60C 1/00* (2013.01); *B60C 1/0016* (2013.01); *C08C 19/02* (2013.01); *C08K 3/04* (2013.01); *C08K 3/36* (2013.01); *C08K 5/0016* (2013.01); *C08L 7/00* (2013.01); *C08L 9/00* (2013.01); *C08L 15/00* (2013.01); *C08L 2205/025* (2013.01); *C08L 2205/035* (2013.01)

(58) Field of Classification Search
CPC .... C08L 15/00; C08L 9/06; C08L 9/00; C08L 7/00; C08L 2205/025; C08L 2205/035; C08C 19/02; B60C 1/00; B60C 1/0016; C08K 3/36; C08K 3/04; C08K 5/0016

USPC .......................................................... 524/62
See application file for complete search history.

(56) References Cited

U.S. PATENT DOCUMENTS

2017/0087936 A1* 3/2017 Minami .................... B60C 9/08
2018/0272801 A1* 9/2018 Fudemoto ................. B60C 1/00

FOREIGN PATENT DOCUMENTS

| JP | 2000-344955 A | | 12/2000 | |
| JP | 2008001747 A | * | 1/2008 | |
| JP | 2012006987 A | * | 1/2012 | |
| WO | WO-2015178366 A1 | * | 11/2015 | |
| WO | WO-2017051891 A1 | * | 3/2017 | ............... B60C 1/00 |

OTHER PUBLICATIONS

English language machine translation of JP 2012/006987 (Year: 2012).*
English language machine translation of JP 2008-001747 (Year: 2008).*
Machine translation of JP-2000-344955-A published on Dec. 12, 2000, 17 pages.

* cited by examiner

*Primary Examiner* — Angela C Scott
(74) *Attorney, Agent, or Firm* — Birch, Stewart, Kolasch & Birch, LLP

(57) ABSTRACT

Provided is a pneumatic tire achieving a balanced improvement of steering stability, fuel economy, and processability. The pneumatic tire is formed from a rubber composition which includes: a rubber component; a plasticizer component; and a filler component. The rubber component includes: a diene rubber; and a copolymer containing an aromatic moiety as a structural unit derived from an aromatic vinyl compound and an ethylene moiety as a structural unit derived from ethylene. The ethylene moiety is present in an amount of 15 to 70% by mass based on 100% by mass of the total structural units of the copolymer excluding the aromatic moiety. The copolymer is present in an amount of 5 to 60% by mass based on 100% by mass of the rubber component. The rubber composition satisfies the following relationship: $B/A=0.45$ to $0.65$.

12 Claims, No Drawings

PNEUMATIC TIRE

TECHNICAL FIELD

The present invention relates to a pneumatic tire formed from a specific rubber composition.

BACKGROUND ART

The steering stability of tires may be improved by increasing their rigidity (hardness or elastic modulus). The hardness or elastic modulus may generally be increased by using a larger amount of a filler component or a smaller amount of a plasticizer component. However, these techniques all tend to deteriorate fuel economy or processability.

Patent Literature 1 proposes a technique for improving fuel economy using a diene rubber (modified rubber) that has been modified with an organosilicon compound containing an amino group and an alkoxy group. Unfortunately, the use of the modified rubber tends to deteriorate processability.

Therefore, there is a need for techniques that provide a balanced improvement of steering stability, fuel economy, and processability.

CITATION LIST

Patent Literature

Patent Literature 1: JP 2000-344955 A

SUMMARY OF INVENTION

Technical Problem

The present invention aims to solve the problems and provide a pneumatic tire achieving a balanced improvement of steering stability, fuel economy, and processability.

Solution to Problem

The present invention relates to a pneumatic tire, formed from a rubber composition, the rubber composition including: a rubber component; a plasticizer component; and a filler component, the rubber component including: a diene rubber; and a copolymer containing an aromatic moiety as a structural unit derived from an aromatic vinyl compound and an ethylene moiety as a structural unit derived from ethylene, the ethylene moiety being present in an amount of 15 to 70% by mass based on 100% by mass of total structural units of the copolymer excluding the aromatic moiety, the copolymer being present in an amount of 5 to 60% by mass based on 100% by mass of the rubber component, the rubber composition satisfying the following relationship: $B/A=0.45$ to 0.65 wherein A represents an amount of the filler component measured by thermogravimetry in accordance with JIS K6226-1:2003, and B represents an amount of the plasticizer component measured by acetone extraction in accordance with JIS K6229:2015.

The copolymer is preferably a hydrogenated copolymer obtained by hydrogenation of a copolymer containing the aromatic moiety and a conjugated diene moiety as a structural unit derived from a conjugated diene compound.

The hydrogenated copolymer is preferably a hydrogenated modified copolymer.

The copolymer preferably has a weight average molecular weight of 50,000 to 2,000,000.

The aromatic moiety is preferably present in an amount of 10 to 45% by mass based on 100% by mass of the copolymer.

The pneumatic tire preferably includes a tread formed from the rubber composition.

Advantageous Effects of Invention

The pneumatic tire of the present invention is formed from a rubber composition which includes: a rubber component; a plasticizer component; and a filler component, wherein the rubber component includes: a diene rubber; and a copolymer containing an aromatic moiety as a structural unit derived from an aromatic vinyl compound and an ethylene moiety as a structural unit derived from ethylene, the ethylene moiety is present in an amount of 15 to 70% by mass based on 100% by mass of the total structural units of the copolymer excluding the aromatic moiety, the copolymer is present in an amount of 5 to 60% by mass based on 100% by mass of the rubber component, and the rubber composition satisfies the following relationship: $B/A=0.45$ to 0.65 wherein A represents the amount of the filler component measured by thermogravimetry in accordance with JIS K6226-1:2003, and B represents the amount of the plasticizer component measured by acetone extraction in accordance with JIS K6229:2015. Thus, the present invention provides a pneumatic tire achieving a balanced improvement of steering stability, fuel economy, and processability.

DESCRIPTION OF EMBODIMENTS

The pneumatic tire of the present invention is formed from a rubber composition which includes a rubber component, a plasticizer component, and a filler component. The rubber component includes a diene rubber and a copolymer containing an aromatic moiety as a structural unit derived from an aromatic vinyl compound and an ethylene moiety as a structural unit derived from ethylene. The ethylene moiety is present in an amount of 15 to 70% by mass based on 100% by mass of the total structural units of the copolymer excluding the aromatic moiety. The copolymer is present in an amount of 5 to 60% by mass based on 100% by mass of the rubber component. The rubber composition satisfies the following relationship: $B/A=0.45$ to 0.65 wherein A represents the amount of the filler component measured by thermogravimetry in accordance with JIS K6226-1:2003, and B represents the amount of the plasticizer component measured by acetone extraction in accordance with JIS K6229:2015.

The incorporation of the copolymer in combination with a diene rubber improves hardness and elastic modulus, and also reduces the deterioration in fuel economy and processability as compared with the conventional techniques of controlling the amount of a filler component or plasticizer component. Therefore, the pneumatic tire provided by the present invention achieves a balanced improvement of steering stability, fuel economy, and processability. The pneumatic tire also provides good wet grip performance and good abrasion resistance in addition to the foregoing properties.

These effects are produced presumably because the ethylene chains in the copolymer form crystalline components which provide a high reinforcing effect.

The copolymer may be a copolymer of an aromatic vinyl compound and ethylene, but is preferably a hydrogenated copolymer obtained by hydrogenation of a copolymer containing an aromatic moiety as a structural unit derived from an aromatic vinyl compound and a conjugated diene moiety as a structural unit derived from a conjugated diene compound. The hydrogenated copolymer is one in which the double bonds of the conjugated diene moieties are hydrogenated so that the conjugated diene moieties are partially or fully converted to ethylene moieties. The amount of the ethylene moiety can be increased by increasing the degree of hydrogenation.

It should be noted that the ethylene moiety of the hydrogenated copolymer refers to a moiety obtained by hydrogenation of the moiety that forms the polymer chain at either end of the conjugated diene compound backbone (e.g., the 1,4-bond moiety in a polymer of 1,3-butadiene monomer), and excludes those obtained by hydrogenation of other forms (e.g., the 1,2-bond (vinyl bond) moiety in a polymer of 1,3-butadiene monomer).

Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. These compounds may be used alone, or two or more of these may be used in combination. Among these, styrene is particularly preferred in view of practical aspects such as monomer availability and because the effects of the present invention can be more suitably achieved.

Examples of the conjugated diene compound include 1,3-butadiene, isoprene, 1,3-pentadiene, 2,3-dimethylbutadiene, 2-phenyl-1,3-butadiene, and 1,3-hexadiene. These compounds may be used alone, or two or more of these may be used in combination. Among these, 1,3-butadiene or isoprene is preferred, with 1,3-butadiene being more preferred, in view of practical aspects such as monomer availability and because the effects of the present invention can be more suitably achieved.

The copolymer may be a random copolymer or a block copolymer. The random copolymer may be, for example, a hydrogenated styrene-butadiene rubber (SBR) obtained by hydrogenating SBR so that the butadiene moieties (structural units derived from butadiene) are partially or fully converted to ethylene moieties. The block copolymer may be, for example, a hydrogenated SBS obtained by hydrogenating a block copolymer (SBS) having a styrene block-butadiene block-styrene block structure so that the butadiene moieties (butadiene block) are partially or fully converted to ethylene moieties. These copolymers may be used alone, or two or more of these may be used in combination. To more suitably achieve the effects of the present invention, hydrogenated SBR is preferred.

Thus, the copolymer is preferably a hydrogenated copolymer, more preferably a hydrogenated SBR. The hydrogenated copolymer is preferably a hydrogenated modified copolymer, more preferably a hydrogenated modified SBR, which has been modified by the method described later.

From the standpoint of abrasion resistance, the degree of hydrogenation of the hydrogenated copolymer (the degree of hydrogenation of the conjugated diene moiety of the copolymer containing an aromatic moiety and a conjugated diene moiety) is preferably 30 mol % or more, more preferably 60 mol % or more, still more preferably 90 mol % or more. The upper limit is not particularly critical and may be 100 mol %.

The degree of hydrogenation may be calculated from the rate of decrease in the intensity of a $^1$H-NMR spectrum corresponding to unsaturated bonds.

It is sufficient that the ethylene moiety be present in an amount of 15 to 70% by mass based on 100% by mass of the total structural units of the copolymer excluding the aromatic moiety. In view of steering stability, the amount is preferably 35% by mass or more, more preferably 50% by mass or more. In view of processability and wet grip performance, it is preferably 68% by mass or less.

From the standpoint of wet grip performance, the aromatic moiety is preferably present in an amount of 10% by mass or more, more preferably 20% by mass or more based on 100% by mass of the copolymer. From the standpoint of fuel economy, the amount is preferably 45% by mass or less, more preferably 40% by mass or less.

The amount of the aromatic moiety is determined by the method described later in EXAMPLES.

In view of abrasion resistance, the copolymer preferably has a weight average molecular weight (Mw) of 50,000 or more, more preferably 200,000 or more, still more preferably 400,000 or more. In view of Mooney viscosity, the Mw is preferably 2,000,000 or less, more preferably 1,000,000 or less, still more preferably 700,000 or less.

Herein, the weight average molecular weight (Mw) and number average molecular weight (Mn) may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

In view of abrasion resistance, the copolymer preferably has a glass transition temperature (Tg) of −70° C. or higher, more preferably −40° C. or higher, still more preferably −35° C. or higher. For the same reason, the Tg is also preferably lower than −10° C., more preferably lower than −15° C., still more preferably lower than −20° C.

The glass transition temperature (Tg) of the copolymer is measured by the method described later in EXAMPLES.
<Method for Producing Copolymer>
(Polymerization Method)

The copolymer may be produced by any polymerization method, including solution polymerization, vapor phase polymerization, and bulk polymerization, particularly preferably by solution polymerization. The polymerization may be carried out either in a batch mode or in a continuous mode.

For solution polymerization, the monomer concentration in the solution is preferably 5% by mass or more, more preferably 10% by mass or more. If the monomer concentration in the solution is less than 5% by mass, the copolymer yield tends to be small, thereby increasing the cost. The monomer concentration in the solution is also preferably 50% by mass or less, more preferably 30% by mass or less. If the monomer concentration in the solution is more than 50% by mass, the solution tends to become too viscous to stir easily, and thus polymerization tends not to occur readily.
(Polymerization Initiator for Anionic Polymerization)

For anionic polymerization, any polymerization initiator may be used. Organic lithium compounds are preferred, and examples include those containing C2-C20 alkyl groups, such as ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclopentyllithium, and reaction products of diisopropenylbenzene and butyllithium. In view of availability, safety, and other aspects, n-butyllithium or sec-butyllithium is preferred among these.

The polymerization reaction may be carried out in the presence of a compound (R) obtained by mixing at least one of the organic lithium compounds mentioned above with a compound (B1) containing a functional group interactive with silica. In the polymerization in the presence of the compound (R), the functional group interactive with silica is introduced into the polymerization initiating terminal of the copolymer. The copolymer thus obtained has a modified polymerization initiating terminal. The term "interactive" herein means the formation of a covalent bond or an intermolecular force weaker than the covalent bond (e.g. an electromagnetic force between molecules such as ion-dipole interaction, dipole-dipole interaction, hydrogen bond, or van der Waals force) between molecules. The term "functional group interactive with silica" refers to a group having at least one atom interactive with silica, such as a nitrogen atom, a sulfur atom, a phosphorus atom, or an oxygen atom.

In particular, the compound (R) is preferably a reaction product of an organic lithium compound and a nitrogen-containing compound, e.g. a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane. The polymerization in the presence of the compound (R) may be carried out by preliminarily mixing an organic lithium compound with a compound (B1) to prepare a compound (R), and adding the compound (R) to the polymerization system. Alternatively, the polymerization may be carried out by adding an organic lithium compound and a compound (B1) to the polymerization system and mixing them in the polymerization system to prepare a compound (R).

(Method for Anionic Polymerization)

The production of the copolymer through anionic polymerization using the polymerization initiator may be carried out by any method including conventionally known methods.

Specifically, monomers, for example, styrene and 1,3-butadiene may be anionically polymerized in an organic solvent inert to the reaction, for example, a hydrocarbon solvent such as an aliphatic, alicyclic, or aromatic hydrocarbon compound using a polymerization initiator such as butyllithium, optionally in the presence of a randomizer to produce a target copolymer, e.g. a styrene-butadiene copolymer.

(Hydrocarbon Solvent for Anionic Polymerization)

The hydrocarbon solvent is preferably a C3-C8 hydrocarbon solvent, and examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These solvents may be used alone, or two or more of these may be used in admixture.

(Randomizer for Anionic Polymerization)

The randomizer refers to a compound that has the function of controlling the microstructure of the conjugated diene moieties of a copolymer, for example, increase of 1,2-butadiene units or 3,4-isoprene units, or the function of controlling the compositional distribution of monomer units in a copolymer, for example, randomization of styrene units and butadiene units in a styrene-butadiene copolymer. The randomizer is not particularly limited, and any known compound commonly and conventionally used as a randomizer may be used. Examples include ethers and tertiary amines, such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine, and 1,2-dipiperidinoethane. Other examples include potassium salts such as potassium-t-amylate and potassium-t-butoxide; and sodium salts such as sodium-t-amylate. These randomizers may be used alone, or two or more of these may be used in combination. The amount of the randomizer used per mol of the organic lithium compound is preferably 0.01 mole equivalents or more, more preferably 0.05 mole equivalents or more. If the amount of the randomizer is less than 0.01 mole equivalents, the added randomizer tends to produce a small effect, and thus randomization tends not to occur readily. The amount of the randomizer per mol of the organic lithium compound is preferably 1,000 mole equivalents or less, more preferably 500 mole equivalents or less. If the amount of the randomizer is more than 1,000 mole equivalents, the reaction rate of monomers tends to change greatly, and the randomization tends to be adversely affected.

The Tg of the copolymer may be controlled by varying the type or amount of the randomizer. For example, the Tg of the copolymer may be decreased by reducing the amount of tetrahydrofuran.

(Reaction Temperature)

The anionic polymerization may be carried out at any reaction temperature as long as the reaction suitably proceeds. Generally, the reaction temperature is preferably −10° C. to 100° C., more preferably 25° C. to 70° C.

(Modification Step)

The active terminal of the copolymer obtained by the above polymerization step may be reacted with a compound (B2) containing a functional group interactive with silica to introduce the functional group interactive with silica into the polymerization terminating terminal of the copolymer. This step allows the copolymer to have a modified polymerization terminating terminal. The term "terminal" herein refers to an end portion of the molecular chain other than monomer-derived structures containing carbon-carbon double bonds.

The copolymer used in the modification reaction (hereinafter, also referred to as terminal modification reaction) may be any copolymer that has an active terminal with an unmodified or modified polymerization initiating terminal. The compound (B2) may be any compound that contains a functional group interactive with silica and is reactable with the polymerization active terminal. Preferable specific examples of the compound (B2) include:

(I) a compound (B2-1) represented by the following formula (1):

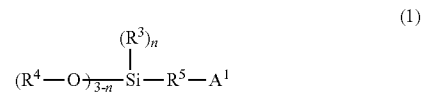

wherein $A^1$ represents a monovalent functional group which contains no active hydrogen but contains at least one selected from the group consisting of a nitrogen atom, a phosphorus atom, and a sulfur atom, and is bound to $R^5$ through the nitrogen, phosphorus, or sulfur atom; $R^3$ and $R^4$ each represent a hydrocarbyl group; $R^5$ represents a hydrocarbylene group; and n represents an integer of 0 to 2, provided that when two or more $R^3$ or $R^4$ groups are present, they may be the same or different;

(II) a compound (B2-2) which has, in the molecule, one or more functional groups (x1) of at least one type selected from the group consisting of a cyclic ether group, a (thio) carbonyl group, and an iso(thio)cyanate group, and one or more groups (x2) which are different from the functional groups (x1) and which contain no active hydrogen but contain at least one selected from the group consisting of a nitrogen atom, a phosphorus atom, an oxygen atom, and a sulfur atom, provided that at least one of the nitrogen, phosphorus, and sulfur atoms may be protected by a trisubstituted hydrocarbylsilyl group; and (III) a compound (B2-3) having two or more iso(thio) cyanate groups in the molecule. These compounds (B2) may be used alone, or two or more of these may be used in combination. Herein, the term "(thio)carbonyl group" refers to a carbonyl group and a thiocarbonyl group; and the term "iso(thio)cyanate group" refers to an isocyanate group and an isothiocyanate group.

The hydrocarbyl group for $R^3$ and $R^4$ in formula (1) is preferably a linear or branched C1-C20 alkyl group, a C3-C20 cycloalkyl group, or a C6-C20 aryl group.

$R^5$ is preferably a linear or branched C1-C20 alkanediyl group, a C3-C20 cycloalkylene group, or a C6-C20 arylene group.

Preferably, n is 0 or 1 for higher reactivity with the copolymer.

$A^1$ contains at least one selected from the group consisting of a nitrogen atom, a phosphorus atom, and a sulfur atom (hereinafter, also referred to as a specific atom), and is bound to $R^5$ through the specific atom. The specific atom is not bound to an active hydrogen, and may be protected by, for example, a trisubstituted hydrocarbylsilyl group. The term "active hydrogen" herein refers to a hydrogen atom bound to an atom other than a carbon atom, and preferably refers to a hydrogen atom having a bond energy lower than the carbon-hydrogen bond of polymethylene.

In particular, $A^1$ is preferably a group that can be converted to an onium ion by the action of an onium salt-forming agent. The compound (B2) containing such a group ($A^1$) can impart excellent shape-retaining properties to the copolymer to be modified.

Specific examples of $A^1$ include a nitrogen-containing group in which two hydrogen atoms of a primary amino group are substituted by two protecting groups; a nitrogen-containing group in which one hydrogen atom of a secondary amino group is substituted by one protecting group; a tertiary amino group; an imino group; a pyridyl group; a phosphorus-containing group in which two hydrogen atoms of a primary phosphino group are substituted by two protecting groups; a phosphorus-containing group in which one hydrogen atom of a secondary phosphino group is substituted by one protecting group; a tertiary phosphino group; and a sulfur-containing group in which one hydrogen atom of a thiol group is substituted by one protecting group. Among these, groups containing a nitrogen atom are preferred because of their good affinity for silica. The term "protecting group" refers to a functional group that converts $A^1$ to a functional group inert to the polymerization active terminal, such as, for example, a trisubstituted hydrocarbylsilyl group.

Specific examples of the compound (B2-1) are described below. Examples of compounds containing both an alkoxysilyl group and a nitrogen-containing group in which two hydrogen atoms of a primary amine are substituted by two protecting groups, a nitrogen-containing group in which one hydrogen atom of a secondary amine is substituted by one protecting group, or a tertiary amino group include N,N-bis(trimethylsilyl)aminopropyltrimethoxysilane,
N,N-bis(trimethylsilyl)aminopropylmethyldiethoxysilane,
N, N',N'-tris(trimethylsilyl)-N-(2-aminoethyl)-3-aminopropyltriethoxysilane, and
3-(4-trimethylsilyl-1-piperazino)propylmethyldimethoxysilane.

Examples of compounds containing both an alkoxysilyl group and an imino group or a pyridyl group include
N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl, methyldiethoxysilyl, or ethyldimethoxysilyl compounds corresponding to the foregoing triethoxysilyl compounds,
N-(3-trimethoxysilylpropyl)-4,5-dihydroimidazole,
N-(3-triethoxysilylpropyl)-4,5-dihydroimidazole,
N-(3-trimethoxysilylpropyl)-4,5-imidazole,
N-(3-triethoxysilylpropyl)-4,5-imidazole,
3-hexamethyleneiminopropyltrimethoxysilane,
3-hexamethyleneiminopropylmethyldimethoxysilane, and
  the foregoing compounds whose alkyl group and alkanediyl group are replaced with a C1-C6 alkyl group and a C1-C6 alkanediyl group, respectively.

Examples of compounds containing both an alkoxysilyl group and a phosphorus-containing group in which two hydrogen atoms of a primary phosphino group are substituted by two protecting groups, a phosphorus-containing group in which one hydrogen atom of a secondary phosphino group is substituted by one protecting group, a tertiary phosphino group, or a sulfur-containing group in which one hydrogen atom of a thiol group is substituted by one protecting group include
P,P-bis(trimethylsilyl)phosphinopropylmethyldimethoxysilane,
P,P-bis(trimethylsilyl)phosphinopropyltrimethoxysilane,
3-dimethylphosphinopropyltrimethoxysilane,
3-dimethylphosphinopropylmethyldimethoxysilane,
3-diphenylphosphinopropyltrimethoxysilane,
3-diphenylphosphinopropyltriethoxysilane,
3-diphenylphosphinopropylmethyldimethoxysilane,
S-trimethylsilylmercaptopropylmethyldimethoxysilane,
S-trimethylsilylmercaptopropyltrimethoxysilane,
S-trimethylsilylmercaptopropyltriethoxysilane,
S-trimethylsilylmercaptopropylmethyldiethoxysilane, and
  the foregoing compounds whose alkyl group and alkanediyl group are replaced with a C1-C6 alkyl group and a C1-C6 alkanediyl group, respectively. In addition, examples of compounds containing an iso(thio)cyanate group include 3-isocyanatopropyltrimethoxysilane and 3-isocyanatopropyltriethoxysilane.

In the compound (B2-2), the group (x2) is preferably a group that contains a nitrogen atom bound to no active hydrogen. Specific examples of such compounds include:
  compounds containing acyclic ether group, such as epoxy amine compounds, e.g. tetraglycidyl-1,3-bisaminomethylcyclohexane,
  compounds containing a (thio)carbonyl group, such as 4-aminoacetophenones, e.g. 4-N,N-dimethylaminobenzophenone;
bis(dihydrocarbylaminoalkyl)ketones, e.g. 1,7-bis(methylethylamino)-4-heptanone;
dihydrocarbylaminoalkyl (meth)acrylates, e.g. 2-dimethylaminoethyl acrylate; hydrocarbylimidazolidinones, e.g. 1,3-dimethyl-2-imidazolidinone;
N-hydrocarbylpyrrolidones, e.g. 1-phenyl-2-pyrrolidone;
N-hydrocarbylcaprolactams, e.g. N-methyl-ε-caprolactam;

N-dihydrocarbylformamides, e.g. N,N-diethylformamide; N,N-dihydrocarbylacetamides, e.g. N,N-dimethylacetamide; and (meth)acrylamides, e.g. N,N-dimethylacrylamide, and compounds containing an iso(thio)cyanate group, such as 3-isocyanatopropyltrimethoxysilane.

Examples of the compound (B2-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl)thiophosphate, xylene diisocyanate, benzene-1,2,4-triisocyanate, naphthalene-1,2,5,7-tetraisocyanate, and 1,4-phenylene diisothiocyanate.

The compound (B2) is particularly preferably a compound (B2-1) because of its high affinity for silica. When a compound (B2-1) is used, for example, silicon tetrachloride or an epoxy-containing compound (e.g. tetraglycidyl-1,3-bisaminomethylcyclohexane) may be used with the compound (B2-1) to control the Mooney viscosity of the modified copolymer. All the compounds (B2) mentioned above have the same function in that they allow the resulting modified copolymer to have a modified polymerization terminating terminal. Accordingly, those which are not disclosed in EXAMPLES later can also be used in the present invention. A structure represented by the formula (1-1) below is introduced into the polymer terminal by the reaction between the compound of formula (1) and the copolymer to be modified.

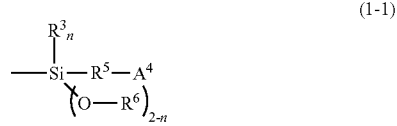

(1-1)

In formula (1-1), $R^6$ represents a hydrogen atom or a hydrocarbyl group, and when two or more $R^6$ groups are present, they may be the same or different. Examples of the hydrocarbyl group for $R^6$ include those listed above for the hydrocarbyl group for $R^3$ and $R^4$ in formula (1). $A^4$, $R^3$, $R^5$ and n are as defined for $A^1$, $R^3$, $R^5$ and n, respectively, in formula (1).

The terminal modification reaction may be performed as a solution reaction, for example. The solution reaction may be carried out using the solution containing unreacted monomers obtained after completion of the polymerization reaction in the polymerization step, or a solution prepared by isolating the copolymer from the above solution and dissolving it in an appropriate solvent such as cyclohexane. The terminal modification reaction may be carried out either batchwise or continuously. Here, the compound (B2) may be added in any manner, such as at one time, in portions, or continuously.

The amount of the compound (B2) used in the terminal modification reaction may be selected appropriately according to the type of compound used in the reaction. The amount of the compound (B2) is preferably 0.1 mole equivalents or more, more preferably 0.3 mole equivalents or more relative to the metal atom of the polymerization initiator involved in the polymerization reaction. With 0.1 mole equivalents or more of the compound (B2), the modification reaction can proceed sufficiently, and the dispersibility of silica can be suitably improved.

The temperature of the terminal modification reaction is usually the same as the temperature of the polymerization reaction, and is preferably −20° C. to 150° C., more preferably 0° C. to 120° C., particularly preferably 20° C. to 100° C. If the modification reaction temperature is low, the viscosity of the modified copolymer tends to increase, while if the modification reaction temperature is high, the polymerization active terminal can be easily deactivated. The duration of the modification reaction is preferably one minute to five hours, more preferably two minutes to one hour.

(Termination of Reaction)

The anionic polymerization may be terminated by addition of a reaction terminator usually used in this field. Examples of the reaction terminator include polar solvents containing active protons such as acetic acid and alcohols (e.g. methanol, ethanol, isopropanol), and mixtures of the foregoing. Other examples include mixtures of the foregoing polar solvents and non-polar solvents such as hexane or cyclohexane. Usually, the amount of the reaction terminator to be added is sufficient when it is about equal to or twice the molar amount of the initiator for anionic polymerization.

<Coupling>

In the method for producing the copolymer, a coupling agent may be added to the hydrocarbon solution of the copolymer at any time from the initiation of the polymerization of monomers until the polymer is recovered as described later. The coupling agent may be a compound represented by the following formula (2-1):

(2-1)

wherein $R^1$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent of formula (2-1) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In order to enhance the processability of the polymer, the amount of the coupling agent to be added is preferably 0.03 mol or more, more preferably 0.05 mol or more, per mol of the alkali metal derived from an alkali metal catalyst. In order to enhance fuel economy, the amount is preferably 0.4 mol or less, more preferably 0.3 mol or less.

<Hydrogenation Method>

The hydrogenation may be carried out by any method under any reaction conditions, including known methods and known conditions. Usually, the hydrogenation is carried out at 20° C. to 150° C. under 0.1 to 10 MPa hydrogen pressure in the presence of a hydrogenation catalyst. The degree of hydrogenation may be set as desired by changing, for example, the amount of the hydrogenation catalyst, the hydrogen pressure during the hydrogenation reaction, or the duration of the reaction. The hydrogenation catalyst used may be usually a compound containing any of the metals of groups 4 to 11 of the periodic table. For example, compounds containing any of the atoms: Ti, V, Co, Ni, Zr, Ru, Rh, Pd, Hf, Re, and Pt can be used as hydrogenation catalysts. More specific examples of the hydrogenation catalyst include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes of Ru, Rh, or other metals; and fullerenes and carbon nanotubes in which hydrogen is stored.

Among the above exemplary compounds, metallocene compounds containing Ti, Zr, Hf, Co, or Ni are preferred because they allow the hydrogenation reaction to be carried out in a homogeneous system in an inert organic solvent. More preferred are metallocene compounds containing Ti, Zr, or Hf. In particular, hydrogenation catalysts obtained by reaction of titanocene compounds and alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B, all of which are hereby incorporated by reference. These hydrogenation catalysts may be used alone, or two or more of these may be used in combination.

It is sufficient that the amount of the copolymer be 5 to 60% by mass based on 100% by mass of the rubber component. In view of steering stability and abrasion resistance, it is preferably 15% by mass or more. In view of wet grip performance, it is preferably 40% by mass or less.

The rubber component of the rubber composition includes a diene rubber. Diene rubbers commonly used in usual rubber compositions for tires other than the above-described copolymer may be used, and examples include natural rubber (NR), polyisoprene rubber (IR), styrene butadiene rubber (SBR), and polybutadiene rubber (BR). These diene rubbers may be used alone, or two or more of these may be used in combination. Among these, NR, BR, and SBR are preferred, and combinations of these rubbers are more preferred.

To well achieve the effects of the present invention, the SBR preferably has a weight average molecular weight (Mw) of 50,000 or more, more preferably 400,000 or more, but preferably 2,000,000 or less, more preferably 1,000,000 or less, still more preferably 700,000 or less.

For the same reason, the SBR preferably has a styrene content of 5% by mass or more, more preferably 15% by mass or more, still more preferably 25% by mass or more, but preferably 50% by mass or less, more preferably 40% by mass or less, still more preferably 35% by mass or less.

To well achieve the effects of the present invention, the amount of SBR based on 100% by mass of the rubber component is preferably 10% by mass or more, more preferably 30% by mass or more, but is preferably 60% by mass or less, more preferably 50% by mass or less.

For the same reason, the amount of BR based on 100% by mass of the rubber component is preferably 5% by mass or more, more preferably 15% by mass or more, but is preferably 40% by mass or less, more preferably 30% by mass or less.

For the same reason, the amount of NR based on 100% by mass of the rubber component is preferably 5% by mass or more, more preferably 15% by mass or more, but is preferably 40% by mass or less, more preferably 30% by mass or less.

The rubber composition contains a filler component and a plasticizer component and satisfies the following relationship: B/A=0.45 to 0.65 wherein A represents the amount of the filler component measured by thermogravimetry in accordance with JIS K6226-1:2003, and B represents the amount of the plasticizer component measured by acetone extraction in accordance with JIS K6229:2015. In view of processability and fuel economy, the ratio B/A is preferably 0.50 or higher, but in view of steering stability it is preferably 0.60 or lower.

The amounts of the filler component (A) and the plasticizer component (B) are not particularly limited, and may be appropriately adjusted so that the ratio falls within the above range. The amounts of the filler component and the plasticizer component are preferably 20 to 50% by mass and 10 to 40% by mass, respectively, based on 100% by mass of the total rubber composition.

The filler component is incorporated into the rubber composition to reinforce rubber. Examples of the filler component include white fillers (inorganic fillers) such as silica, calcium carbonate, mica, aluminum hydroxide, magnesium oxide, magnesium hydroxide, clay, talc, alumina, and titanium oxide, and carbon black. These fillers may be used alone, or two or more of these may be used in combination. Among these, silica or carbon black is preferred, with a combination of these fillers being more preferred.

In the thermogravimetry in accordance with JIS K6226-1:2003, a decrement in mass during the temperature increase from 550° C. to 650° C. corresponds to the amount of carbon black, and the mass of the residue at 650° C. corresponds to the amount of inorganic fillers such as silica.

Non-limiting examples of the silica include dry silica (anhydrous silica) and wet silica (hydrous silica). Wet silica is preferred because it contains a large number of silanol groups.

In view of abrasion resistance, the silica preferably has a nitrogen adsorption specific surface area ($N_2SA$) of 60 $m^2/g$ or more, more preferably 120 $m^2/g$ or more. In view of fuel economy, the $N_2SA$ is preferably 300 $m^2/g$ or less, more preferably 200 $m^2/g$ or less.

The nitrogen adsorption specific surface area of the silica is determined by the BET method in accordance with ASTM D3037-81.

In view of fuel economy, the amount of silica per 100 parts by mass of the rubber component is preferably 30 parts by mass or more, more preferably 50 parts by mass or more, but in view of Mooney viscosity it is preferably 120 parts by mass or less, more preferably 100 parts by mass or less.

Examples of the carbon black include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These types of carbon black may be used alone, or two or more of these may be used in combination.

The carbon black usually has a nitrogen adsorption specific surface area ($N_2SA$) of 5 to 200 $m^2/g$. In view of abrasion resistance, the $N_2SA$ is preferably 50 $m^2/g$ or more, more preferably 80 $m^2/g$ or more, but in view of fuel economy it is preferably 150 $m^2/g$ or less, more preferably 120 $m^2/g$ or less. The carbon black usually has a dibutyl phthalate (DBP) absorption of 5 to 300 mL/100 g. Preferably, the lower limit of the DBP absorption is 80 mL/100 g, while the upper limit is 180 mL/100 g. The nitrogen adsorption specific surface area is measured in accordance with ASTM D4820-93. The DBP absorption is measured in accordance with ASTM D2414-93.

In view of abrasion resistance, the amount of carbon black per 100 parts by mass of the rubber component is preferably 1 part by mass or more, more preferably 3 parts by mass or more. In view of fuel economy, the amount of carbon black per 100 parts by mass of the rubber component is preferably 30 parts by mass or less, more preferably 15 parts by mass or less.

The silica is preferably used together with a silane coupling agent. Conventionally known silane coupling agents may be used, and examples include: sulfide silane coupling agents such as bis(3-triethoxysilylpropyl)tetrasulfide, bis(2-triethoxysilylethyl)tetrasulfide, bis(3-trimethoxysilylpropyl) tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used alone, or two or more of these may be used in combination. In view of the coupling effect produced by the silane coupling agent, processability, and cost, sulfide silane coupling agents are preferred among these, with bis(3-triethoxysilylpropyl)tetrasulfide or bis(3-triethoxysilylpropyl)disulfide being more preferred.

In view of fuel economy and abrasion resistance, the amount of the silane coupling agent per 100 parts by mass of silica is preferably 3 parts by mass or more, more preferably 5 parts by mass or more. In view of Mooney viscosity, the amount of the silane coupling agent per 100 parts by mass of silica is preferably 15 parts by mass or less, more preferably 10 parts by mass or less.

Examples of the plasticizer component include oils, resins, antioxidants, waxes, stearic acid, and vulcanization accelerators. These plasticizers may be used alone, or two or more of these may be used in combination.

Examples of oils include aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The oil preferably has a polycyclic aromatic content of less than 3% by mass, more preferably less than 1% by mass. The polycyclic aromatic content is measured in accordance with the Institute of Petroleum (IP, U.K.) 346/92 method. The oil preferably has an aromatic content (CA) of 20% by mass or more. Two or more of such oils may be used in combination.

In view of Mooney viscosity, the amount of the oil per 100 parts by mass of the rubber component is preferably 5 parts by mass or more, more preferably 10 parts by mass or more. In view of fuel economy, the amount of the oil per 100 parts by mass of the rubber component is preferably 50 parts by mass or less, more preferably 40 parts by mass or less.

Examples of resins include C5 petroleum resins, C9 petroleum resins, coumarone-indene resins, indene resins, phenolic resins, and copolymers of α-methylstyrene and/or styrene. These resins may be used alone, or two or more of these may be used in combination. Among these, coumarone-indene resins, phenolic resins (in particular terpene phenol resins), and copolymers of α-methylstyrene and/or styrene are preferred, with copolymers of α-methylstyrene and styrene being more preferred.

In view of wet grip performance, the amount of the resin per 100 parts by mass of the rubber component is preferably 1 part by mass or more, more preferably 3 parts by mass or more. In view of fuel economy, the amount of the resin per 100 parts by mass of the rubber component is preferably 20 parts by mass or less, more preferably 10 parts by mass or less.

Examples of antioxidants include: naphthylamine antioxidants such as phenyl-α-naphthylamine; diphenylamine antioxidants such as octylated diphenylamine and 4,4'-bis(a,a'-dimethylbenzyl)diphenylamine; p-phenylenediamine antioxidants such as N-phenyl-N'-isopropyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl) propionate]methane. These antioxidants may be used alone, or two or more of these may be used in combination. Among these, p-phenylenediamine antioxidants are preferred, with N-phenyl-N'-isopropyl-p-phenylenediamine being more preferred. The amount of the antioxidant per 100 parts by mass of the rubber component is preferably 0.1 to 5 parts by mass, more preferably 0.2 to 4 parts by mass.

Examples of waxes include petroleum waxes such as paraffin wax and microcrystalline wax; naturally occurring waxes such as plant and animal waxes; and synthetic waxes such as polymers of ethylene, propylene, or the like. These waxes may be used alone, or two or more of these may be used in combination. Among these, petroleum waxes are preferred, with paraffin wax being more preferred. The amount of the wax per 100 parts by mass of the rubber component is preferably 0.1 to 5 parts by mass, more preferably 0.2 to 4 parts by mass.

The stearic acid may be a conventionally known one, and examples include products of NOF Corporation, Kao Corporation, Wako Pure Chemical Industries, Ltd., and Chiba Fatty Acid Co., Ltd. These products may be used alone, or two or more of these may be used in combination. The amount of stearic acid per 100 parts by mass of the rubber component is preferably 0.1 to 5 parts by mass, more preferably 0.2 to 4 parts by mass.

Examples of vulcanization accelerators include thiazole vulcanization accelerators such as 2-mercaptobenzothiazole and dibenzothiazyl disulfide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. These vulcanization accelerators may be used alone, or two or more of these may be used in combination. To more suitably achieve the effects of the present invention, sulfenamide vulcanization accelerators are preferred among these, with N-cyclohexyl-2-benzothiazolesulfenamide being more preferred. They are also preferably used in combination with guanidine vulcanization accelerators. The amount of the vulcanization accelerator per 100 parts by mass of the rubber component is preferably 0.1 to 5 parts by mass, more preferably 0.2 to 4 parts by mass.

The rubber composition may contain, in addition to the above-described components, compounding agents conventionally used in the rubber industry. Examples include vulcanizing agents such as sulfur, vulcanization activators such as zinc oxide, organic peroxides, and processing aids such as lubricants.

The vulcanizing agent is not particularly limited and may suitably be sulfur. The amount of sulfur per 100 parts by mass of the rubber component is preferably 0.5 to 5 parts by mass, more preferably 1 to 3 parts by mass. In this case, the effects of the present invention can be more suitably achieved.

The rubber composition may be prepared by usual methods. Specifically, for example, it may be prepared by kneading the components described above in a Banbury mixer, a kneader, an open roll mill, or other devices, and vulcanizing the kneaded mixture.

The rubber composition can be used in various tire components, such as treads, sidewalls, carcasses, belts, beads, clinches, or chafers, and suitably in treads, among others. In the case of a two-layer tread, it consists of an outer surface layer (cap tread) and an inner surface layer (base tread).

A multi-layer tread may be produced by assembling sheets of a rubber composition into a predetermined shape, or by feeding a rubber composition into the two or more screws of an extruder, followed by forming into a two- or more-layered product at the head outlet of the extruder.

The pneumatic tire of the present invention may be formed from the rubber composition by conventional methods. Specifically, the unvulcanized rubber composition containing the above-described rubber component and compounding agents as needed may be extruded and processed into the shape of a tire component such as a tread, and then assembled with other tire components in a conventional manner on a tire building machine to build an unvulcanized tire, which may then be heated and pressurized in a vulcanizer to produce a pneumatic tire of the present invention.

The pneumatic tire of the present invention is suitable for, for example, passenger vehicles, trucks and buses, two-wheeled vehicles, and racing vehicles, especially for passenger vehicles.

EXAMPLES

The present invention is specifically described with reference to, but not limited to, examples.

The chemicals used in the synthesis and polymerization are listed below. The chemicals were purified as needed by conventional techniques.

n-Hexane: product of Kanto Chemical Co., Inc.
Styrene: product of Kanto Chemical Co., Inc.
Butadiene: 1,3-butadiene available from Tokyo Chemical Industry Co., Ltd.
THF: tetrahydrofuran available from Kanto Chemical Co., Inc.
n-Butyllithium: 1.6 M solution of n-butyllithium in hexane available from Kanto Chemical Co., Inc.
Ethanol: product of Kanto Chemical Co., Inc.
2,6-Di-tert-butyl-p-cresol: Nocrac 200 available from Ouchi Shinko Chemical Industrial Co., Ltd.
Amine modifier: N,N-bis(trimethylsilyl)aminopropylmethyldiethoxysilane The methods for evaluating the prepared polymers are described together below.

(Measurement of Degree of Hydrogenation of Conjugated Diene Moiety of Copolymer)

A 15% by mass solution of each copolymer in carbon tetrachloride as a solvent was prepared to measure a $^1$H-NMR spectrum at 100 MHz. The degree of hydrogenation was calculated from the rate of decrease in the intensity of the $^1$H-NMR spectrum corresponding to unsaturated bonds.

(Structural Identification of Copolymer)

The structural identification of each copolymer was performed using a JNM-ECA series apparatus available from JEOL Ltd. In the analysis, 0.1 g of each unhydrogenated polymer was dissolved in 15 mL of toluene, and the solution was slowly poured into 30 mL of methanol for reprecipitation. The precipitate was dried under reduced pressure prior to the analysis. The styrene content (the amount of the styrene moiety) and the ethylene content (the amount of the ethylene moiety) were determined based on the analysis results.

(Measurement of Weight Average Molecular Weight (Mw) and Number Average Molecular Weight (Mn))

The weight average molecular weight (Mw) and number average molecular weight (Mn) of each polymer were determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards. In the case of polymers containing a modifying group, the Mw and Mn were measured on the corresponding unmodified polymers. This is because the Mw and Mn of copolymers containing a modifying group cannot be accurately determined due to the interaction between the modifying group and the silica gel in the column.

(Measurement of Glass Transition Temperature (Tg))

The glass transition temperature (Tg) was defined as the glass transition onset temperature measured using a differential scanning calorimeter (Q200 available from TA Instruments, Japan) at a temperature increase rate of 10° C./min in accordance with JIS K 7121.

Copolymer Production Examples

Synthesis Example 1 (Synthesis of SBR)

A sufficiently nitrogen-purged heat-resistant reaction vessel was charged with 2,000 mL of n-hexane, 60 g of styrene, 140 g of butadiene, 2.5 g of THF, and 0.45 mmol of n-butyllithium, followed by stirring at 50° C. for five hours to cause a polymerization reaction. Thereafter, the reaction was terminated by addition of ethanol, and 1 g of 2,6-di-tert-butyl-p-cresol was added to the reaction solution, followed by purification by reprecipitation to obtain SBR.

Synthesis Example 2 (Synthesis of Hydrogenated Copolymer 1)

A sufficiently nitrogen-purged heat-resistant reaction vessel was charged with 2,000 mL of n-hexane, 60 g of styrene, 140 g of 1,3-butadiene, 2.5 g of THF, and 0.45 mmol of n-butyllithium, followed by stirring at 50° C. for five hours to cause a polymerization reaction. Thereafter, 0.15 mol of the amine modifier was added, and the mixture was stirred at 0° C. for one hour.

Next, the reaction solution was stirred for 20 minutes while supplying hydrogen gas at a pressure of 0.4 MPa gauge to react the unreacted polymer terminal lithium with hydrogen into lithium hydride. Hydrogenation was performed using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature, and the hydrogen pressure was returned to an ordinary pressure. Then, the reaction solution was drawn from the reaction vessel and introduced into water with stirring. The solvent was removed by steam stripping to obtain a hydrogenated copolymer 1 (hydrogenated SBR).

Synthesis Example 3 (Synthesis of Hydrogenated Copolymer 2)

A hydrogenated copolymer 2 (hydrogenated SBR) was produced as in Synthesis Example 2, except that the cumulative amount of absorbed hydrogen was adjusted so as to correspond to the target degree of hydrogenation.

Table 1 below shows the analytical data of the SBR and hydrogenated copolymers 1 and 2 synthesized as above and of hydrogenated copolymers 3 and 4 which will be described later.

TABLE 1

|  | SBR | Hydrogenated copolymer | | | |
|---|---|---|---|---|---|
|  |  | 1 | 2 | 3 | 4 |
| Degree of hydrogenation (mol %) | 0 | 96 | 77 | 99 | 80 |
| Styrene content (% by mass) | 31 | 30 | 30 | 16 | 20 |
| Weight average molecular weight (Mw) | 470,000 | 510,000 | 440,000 | 150,000 | 90,000 |
| Mw/Mn | 1.2 | 1.2 | 1.2 | 1.2 | 1.3 |
| Glass transition temperature (Tg) (° C.) | −30 | −31 | −31 | −50 | −65 |
| Ethylene content (% by mass) | 0 | 67 | 48 | 19 | 64 |

The chemicals used in examples and comparative examples are listed below.
NR: TSR20
BR: BR150B available from Ube Industries, Ltd.
SBR: SBR synthesized as above
Hydrogenated copolymers 1 and 2: hydrogenated copolymers synthesized as above
Hydrogenated copolymer 3: DYNARON® 2324P (hydrogenated SBR) available from JSR Corporation
Hydrogenated copolymer 4: Tuftec® H1052 (hydrogenated SBS (SEBS)) available from Asahi Kasei Corporation
Carbon black: Diablack N339 ($N_2SA$: 96 m$^2$/g, DBP absorption: 124 mL/100 g) available from Mitsubishi Chemical Corporation
Silica: ULTRASIL VN3 ($N_2SA$: 180 m$^2$/g) available from Evonik
Silane coupling agent: Si69 (bis(3-triethoxy-silylpropyl) tetrasulfide) available from Evonik
Oil: X-140 available from JX Nippon Oil & Energy Corporation
Resin: SYLVARES SA85 (α-methylstyrene resin (a copolymer of α-methylstyrene and styrene) available from Arizona Chemical Antioxidant: Antigene 3C (N-phenyl-N'-isopropyl-p-phenylenediamine) available from Sumitomo Chemical Co., Ltd.
Stearic acid: stearic acid beads "TSUBAKI" available from NOF Corporation
Zinc oxide: zinc oxide #1 available from Mitsui Mining & Smelting Co., Ltd.
Wax: Sunnoc N (paraffin wax) available from Ouchi Shinko Chemical Industrial Co., Ltd.
Sulfur: sulfur powder available from Tsurumi Chemical Industry Co., Ltd.
Vulcanization accelerator (1): Soxinol CZ (N-cyclohexyl-2-benzothiazolylsulfenamide) available from Sumitomo Chemical Co., Ltd.
Vulcanization accelerator (2): Soxinol D (1,3-diphenylguanidine) available from Sumitomo Chemical Co., Ltd.

Examples and Comparative Examples

According to each of the formulations shown in Table 2, the materials other than sulfur and vulcanization accelerators were kneaded for five minutes at 150° C. using a 1.7 L Banbury mixer (Kobe Steel, Ltd.) to give a kneaded mixture. Next, the sulfur and vulcanization accelerators were added to the kneaded mixture, followed by kneading for five minutes at 80° C. using an open roll mill to obtain an unvulcanized rubber composition.

The unvulcanized rubber composition was press-vulcanized for 20 minutes at 170° C. in a 0.5 mm-thick die to obtain a vulcanized rubber composition.

Separately, the unvulcanized rubber composition prepared as above was formed into the shape of a tread and assembled with other tire components, followed by vulcanization at 170° C. for 20 minutes to obtain a test tire.
<Evaluation Items and Testing Methods>
The unvulcanized rubber compositions, vulcanized rubber compositions, and test tires prepared as above were evaluated for the following items. Table 2 shows the results.
(Hs)
The hardness (Hs) of a test piece prepared from each vulcanized rubber composition was measured using a type A durometer in accordance with JIS K 6253 "Rubber, vulcanized or thermoplastic—Determination of hardness". The values (measured at a temperature of 23° C.±2° C.) are expressed as an index, with Comparative Example 1 set equal to 100. A higher index indicates a greater Hs value and better steering stability. An index of 100 or higher is considered good.
(Mooney Viscosity)
The Mooney viscosity of each unvulcanized rubber composition was measured at 130° C. by a method for measuring Mooney viscosity in accordance with JIS K 6300. The reciprocals of the Mooney viscosities are expressed as an index, with Comparative Example 1 set equal to 100. A higher index indicates a lower Mooney viscosity and better processability. An index of 80 or higher is considered good.
(Fuel Economy)

The tan δ of each vulcanized rubber composition was measured at a dynamic strain amplitude of 1%, a frequency of 10 Hz, and a temperature of 50° C. using a spectrometer available from Ueshima Seisakusho Co., Ltd. The reciprocals of the tan δ values are expressed as an index, with Comparative Example 1 set equal to 100. A higher index indicates a lower rolling resistance and better fuel economy. An index of 80 or higher is considered good.

<Wet Grip Performance>

Each set of the test tires was mounted on a front-engine, front-wheel-drive car of 2,000 cc displacement made in Japan. The braking distance of the car from an initial speed of 100 km/h under wet asphalt road conditions was determined. The reciprocals of the braking distances are expressed as an index, with Comparative Example 1 set equal to 100. A higher index indicates a shorter breaking distance and better wet grip performance. An index of 80 or higher is considered good.

(Abrasion Resistance)

The volume loss of each vulcanized rubber composition was measured with a laboratory abrasion and skid tester (LAT tester) at a load of 50 N, a speed of 20 km/h, and a slip angle of 5 degrees. The reciprocals of the volume losses are expressed as an index, with Comparative Example 1 set equal to 100. A higher index indicates better abrasion resistance.

TABLE 2

|  |  | Comp. Ex. 1 | Comp. Ex. 2 | Comp. Ex. 3 | Comp. Ex. 4 | Ex. 1 | Ex. 2 | Ex. 3 | Comp. Ex. 5 | Comp. Ex. 6 | Ex. 4 | Ex. 5 |
|---|---|---|---|---|---|---|---|---|---|---|---|---|
| Formulation (parts by mass) | NR | 20 | 20 | 20 | 20 | 20 | 20 | 20 | — | 20 | 20 | 20 |
|  | BR | 20 | 20 | 20 | 20 | 20 | 20 | 20 | 20 | 20 | 20 | 20 |
|  | SBR | 60 | 60 | 60 | 57 | 50 | 30 | 10 | — | 30 | 30 | 30 |
|  | Hydrogenated copolymer 1 | — | — | — | 3 | 10 | 30 | 50 | 80 | 30 | 30 | 30 |
|  | Hydrogenated copolymer 2 | — | — | — | — | — | — | — | — | — | — | — |
|  | Hydrogenated copolymer 3 | — | — | — | — | — | — | — | — | — | — | — |
|  | Hydrogenated copolymer 4 | — | — | — | — | — | — | — | — | — | — | — |
|  | Carbon black | 5 | 5 | 5 | 5 | 5 | 5 | 5 | 5 | 5 | 5 | 5 |
|  | Silica | 85 | 120 | 85 | 85 | 85 | 85 | 85 | 85 | 40 | 70 | 100 |
|  | Silane coupling agent | 8.5 | 12 | 8.5 | 8.5 | 8.5 | 8.5 | 8.5 | 8.5 | 4 | 7 | 10 |
|  | Oil | 25 | 25 | 40 | 25 | 25 | 25 | 25 | 25 | 25 | 25 | 25 |
|  | Resin | 5 | 5 | 5 | 5 | 5 | 5 | 5 | 5 | 5 | 5 | 5 |
|  | Antioxidant | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 |
|  | Zinc oxide | 2 | 2 | 2 | 2 | 2 | 2 | 2 | 2 | 2 | 2 | 2 |
|  | Wax | 2 | 2 | 2 | 2 | 2 | 2 | 2 | 2 | 2 | 2 | 2 |
|  | Sulfur | 1.2 | 1.2 | 1.2 | 1.2 | 1.2 | 1.2 | 1.2 | 1.2 | 1.2 | 1.2 | 1.2 |
|  | Vulcanization accelerator (1) | 1.8 | 1.8 | 1.8 | 1.8 | 1.8 | 1.8 | 1.8 | 1.8 | 1.8 | 1.8 | 1.8 |
|  | Vulcanization accelerator (2) | 1.2 | 1.2 | 1.2 | 1.2 | 1.2 | 1.2 | 1.2 | 1.2 | 1.2 | 1.2 | 1.2 |
| Compounding ratio | Filler component (% by mass) | 37 | 45 | 35 | 37 | 37 | 37 | 37 | 37 | 24 | 33 | 41 |
|  | Plasticizer component (% by mass) | 20 | 18 | 24 | 20 | 20 | 20 | 20 | 20 | 22 | 21 | 19 |
|  | Plasticizer component/Filler component | 0.53 | 0.41 | 0.69 | 0.53 | 0.53 | 0.53 | 0.53 | 0.53 | 0.96 | 0.61 | 0.47 |
| Evaluation | Hs index | 100 | 114 | 90 | 101 | 107 | 110 | 111 | 111 | 82 | 102 | 112 |
|  | Mooney viscosity index | 100 | 77 | 124 | 98 | 97 | 94 | 90 | 84 | 131 | 109 | 83 |
|  | Fuel economy index | 100 | 70 | 96 | 101 | 104 | 112 | 114 | 117 | 115 | 95 | 85 |
|  | Wet grip performance index | 100 | 110 | 98 | 97 | 94 | 91 | 85 | 61 | 70 | 87 | 99 |
|  | Abrasion resistance index | 100 | 115 | 96 | 100 | 102 | 113 | 116 | 125 | 80 | 111 | 130 |

|  |  | Comp. Ex. 7 | Comp. Ex. 8 | Ex. 6 | Ex. 7 | Comp. Ex. 9 | Ex. 8 | Ex. 9 | Ex. 10 |
|---|---|---|---|---|---|---|---|---|---|
| Formulation (parts by mass) | NR | 20 | 20 | 20 | 20 | 20 | 20 | 20 | 20 |
|  | BR | 20 | 20 | 20 | 20 | 20 | 20 | 20 | 20 |
|  | SBR | 30 | 30 | 30 | 30 | 30 | 30 | 30 | 30 |
|  | Hydrogenated copolymer 1 | 30 | 30 | 30 | 30 | 30 | — | — | — |
|  | Hydrogenated copolymer 2 | — | — | — | — | — | 30 | — | — |
|  | Hydrogenated copolymer 3 | — | — | — | — | — | — | 30 | — |
|  | Hydrogenated copolymer 4 | — | — | — | — | — | — | — | 30 |
|  | Carbon black | 5 | 5 | 5 | 5 | 5 | 5 | 5 | 5 |
|  | Silica | 120 | 85 | 85 | 85 | 85 | 85 | 85 | 85 |
|  | Silane coupling agent | 12 | 8.5 | 8.5 | 8.5 | 8.5 | 8.5 | 8.5 | 8.5 |
|  | Oil | 25 | 17 | 22 | 35 | 40 | 25 | 25 | 25 |
|  | Resin | 5 | 5 | 5 | 5 | 5 | 5 | 5 | 5 |
|  | Antioxidant | 2 | 2 | 2 | 2 | 2 | 2 | 2 | 2 |
|  | Stearic acid | 2 | 2 | 2 | 2 | 2 | 2 | 2 | 2 |
|  | Zinc oxide | 2 | 2 | 2 | 2 | 2 | 2 | 2 | 2 |
|  | Wax | 2 | 2 | 2 | 2 | 2 | 2 | 2 | 2 |
|  | Sulfur | 1.2 | 1.2 | 1.2 | 1.2 | 1.2 | 1.2 | 1.2 | 1.2 |
|  | Vulcanization accelerator (1) | 1.8 | 1.8 | 1.8 | 1.8 | 1.8 | 1.8 | 1.8 | 1.8 |
|  | Vulcanization accelerator (2) | 1.2 | 1.2 | 1.2 | 1.2 | 1.2 | 1.2 | 1.2 | 1.2 |

TABLE 2-continued

| | | | | | | | | | |
|---|---|---|---|---|---|---|---|---|---|
| Compounding ratio | Filler component (% by mass) | 45 | 39 | 38 | 36 | 35 | 37 | 37 | 37 |
| | Plasticizer component (% by mass) | 18 | 17 | 19 | 23 | 24 | 20 | 20 | 20 |
| | Plasticizer component/Filler component | 0.41 | 0.44 | 0.49 | 0.64 | 0.69 | 0.53 | 0.53 | 0.53 |
| Evaluation | Hs index | 118 | 105 | 106 | 102 | 95 | 106 | 107 | 109 |
| | Mooney viscosity index | 73 | 78 | 97 | 115 | 124 | 98 | 97 | 98 |
| | Fuel economy index | 79 | 104 | 103 | 101 | 94 | 108 | 107 | 107 |
| | Wet grip performance index | 105 | 89 | 87 | 88 | 85 | 93 | 85 | 84 |
| | Abrasion resistance index | 114 | 116 | 114 | 109 | 90 | 110 | 106 | 107 |

As shown in Table 2, the steering stability and fuel economy of Examples 1 to 10 were improved while ensuring good processability as compared to Comparative Example 1. These results demonstrate that a balanced improvement of steering stability, fuel economy, and processability was achieved by using a rubber composition that contained a predetermined amount of a copolymer containing an ethylene moiety in an amount falling within a predetermined range (hydrogenated copolymer 1 to 4 in Table 2) and had a plasticizer component/filler component ratio falling within a predetermined range.

Moreover, in addition to the above properties, Examples 1 to 10 also exhibited improved abrasion resistance while ensuring good wet grip performance.

The invention claimed is:

1. A pneumatic tire, formed from a rubber composition, the rubber composition comprising:
    a rubber component that comprises, based on 100% by mass of the rubber component, natural rubber in an amount of 5% to 40% by mass, polybutadiene rubber in an amount of 5% to 40% by mass, styrene butadiene rubber in an amount of 10% to 60% by mass, and a random copolymer in an amount of 5% to 60% by mass;
    a plasticizer component which is one or more members of the group comprising oils, resins, antioxidants, waxes, stearic acid and vulcanization accelerators; and
    a filler component,
    wherein
        the random copolymer has a weight average molecular weight of 50,000 to 2,000,000 and contains an aromatic moiety as a structural unit derived from an aromatic vinyl compound and an ethylene moiety as a structural unit derived from ethylene,
        the ethylene moiety is present in an amount of 15 to 70% by mass based on 100% by mass of total structural units of the random copolymer excluding the aromatic moiety, and
        the rubber composition satisfies the following relationship: B/A=0.45 to 0.65 wherein A represents an amount of the filler component measured by thermogravimetry in accordance with JIS K6226-1:2003, and B represents an amount of the plasticizer component measured by acetone extraction in accordance with JIS K6229:2015.

2. The pneumatic tire according to claim 1, wherein the random copolymer is a hydrogenated random copolymer obtained by hydrogenation of a random copolymer containing the aromatic moiety and a conjugated diene moiety as a structural unit derived from a conjugated diene compound.

3. The pneumatic tire according to claim 2, wherein the hydrogenated random copolymer is a hydrogenated modified random copolymer.

4. The pneumatic tire according to claim 1, wherein the aromatic moiety is present in an amount of 10 to 45% by mass based on 100% by mass of the random copolymer.

5. The pneumatic tire according to claim 1, wherein the pneumatic tire comprises a tread formed from the rubber composition.

6. The pneumatic tire according to claim 1, wherein the random copolymer has a weight average molecular weight of 400,000 to 2,000,000.

7. The pneumatic tire according to claim 1, wherein the random copolymer is an hydrogenated random copolymer that has a degree of hydrogenation of 60 mol % or more and a weight average molecular weight of 400,000 to 2,000,000.

8. The pneumatic tire according to claim 1, wherein the random copolymer has a glass transition temperature of −70° C. or higher.

9. The pneumatic tire according to claim 1, wherein the styrene butadiene rubber has a weight average molecular weight of 50,000 to 2,000,000 and a styrene content of 5% to 50% by mass or less.

10. The pneumatic tire according to claim 1, wherein the random copolymer comprises a copolymer of a-methylstyrene and/or styrene.

11. The pneumatic tire according to claim 1, wherein the filler component comprises, based on 100 parts by mass of the rubber component, silica in an amount of 50 parts by mass to 120 parts by mass, and carbon black in an amount of 1 part by mass to 30 parts by mass.

12. The pneumatic tire according to claim 1, wherein the plasticizer component comprises, based on 100 parts by mass of the rubber component, an oil in an amount of 5 parts by mass to 50 parts by mass, and one or more members of the group comprising resins, antioxidants, waxes, stearic acid and vulcanization accelerators.

* * * * *